United States Patent
Wu et al.

(10) Patent No.: US 7,679,547 B2
(45) Date of Patent: Mar. 16, 2010

(54) DIRECTION OF TRAVEL MOTION DETECTOR WITH AUTOMATIC GAIN CONTROL

(75) Inventors: Xiaodong Wu, Roseville, CA (US);
Leslie K. Green, Applegate, CA (US);
James N. Helland, Agoura Hills, CA (US)

(73) Assignee: Honeywell International Inc., Morristown, NJ (US)

( * ) Notice: Subject to any disclaimer, the term of this patent is extended or adjusted under 35 U.S.C. 154(b) by 292 days.

(21) Appl. No.: 11/862,076

(22) Filed: Sep. 26, 2007

(65) Prior Publication Data

US 2009/0079615 A1    Mar. 26, 2009

(51) Int. Cl.
*G01S 13/00* (2006.01)
*G01S 13/08* (2006.01)

(52) U.S. Cl. .......................... 342/28; 342/104
(58) Field of Classification Search ............ 342/28, 342/104
See application file for complete search history.

(56) References Cited

U.S. PATENT DOCUMENTS

| | | | |
|---|---|---|---|
| 3,877,002 | A | 4/1975 | Cheal et al. |
| 5,136,298 | A | 8/1992 | Williams |
| 5,150,099 | A | 9/1992 | Lienau |
| 5,287,111 | A | 2/1994 | Shpater |
| 6,091,355 | A * | 7/2000 | Cadotte et al. ............ 342/104 |
| 6,380,882 | B1 | 4/2002 | Hegnauer |
| 6,856,243 | B2 * | 2/2005 | Smith et al. ............ 340/384.2 |
| 7,119,737 | B2 | 10/2006 | Tsuji |
| 2007/0176765 | A1 | 8/2007 | Babich et al. |
| 2008/0001767 | A1 * | 1/2008 | Cole ..................... 340/627 |

FOREIGN PATENT DOCUMENTS

GB    1 554 661    10/1979

OTHER PUBLICATIONS www.security.honeywell.com/hsce visited on May 15, 2007.
www.security.honeywell.com/hsce/products/sensor/mo/re/18987.html visited on May 15, 2007.
www.security.honeywell.com/hsce/products/sensor/mo/co/19018.html visited on May 15, 2007.

(Continued)

*Primary Examiner*—Thomas H Tarcza
*Assistant Examiner*—Harry Liu
(74) *Attorney, Agent, or Firm*—Husch Blackwell Sanders Welsh & Katz

(57) ABSTRACT

Disclosed is a microwave direction of travel detector and method of doing the same. The microwave direction of travel detector comprising, a microwave transceiver for transmitting and receiving a microwave signal directed toward a protected area for outputting a Doppler signal when a moving target is detected, an amplifier chain including one or more amplifiers coupled to the microwave transceiver for receiving and amplifying the Doppler signal from the microwave transceiver, wherein at least one amplifier having variable gain and; a controller for sampling an output gain of each variable gain amplifier and for controlling each variable gain amplifier by adjusting a gain of each variable gain amplifier to keep the Doppler signal level constant and to avoid saturation of each said variable gain amplifier. If the output gains of each variable gain amplifier is increasing or decreasing the controller indicates a direction of travel.

9 Claims, 1 Drawing Sheet

OTHER PUBLICATIONS www.security.honeywell.com/hsce/products/sensor/mo/co/19008.html visited on May 15, 2007.

European Search Report, mailed Mar. 10, 2009 corresponding to International application No. 08165110.1-2220.

* cited by examiner

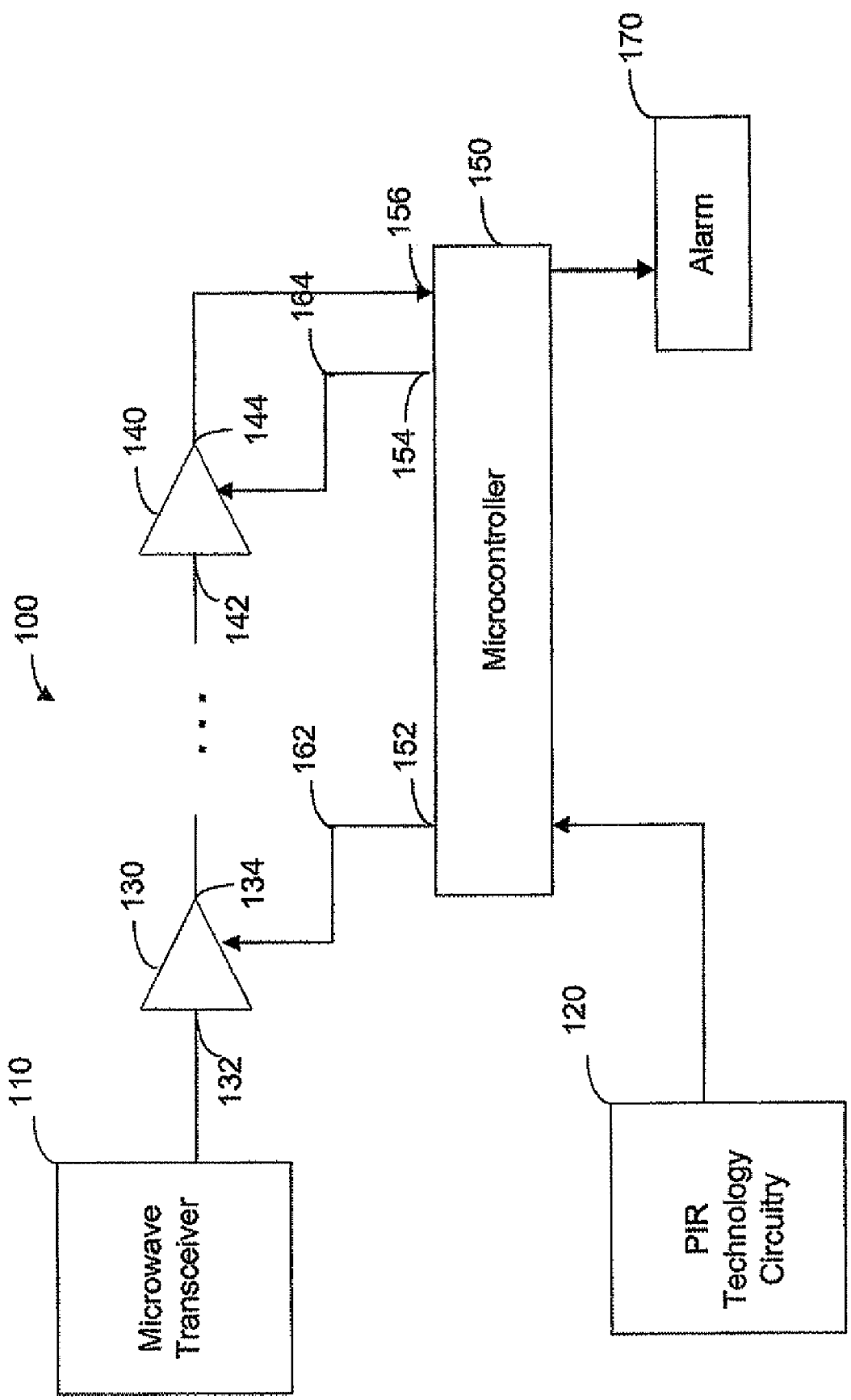

DIRECTION OF TRAVEL MOTION DETECTOR WITH AUTOMATIC GAIN CONTROL

CROSS-REFERENCE TO RELATED APPLICATIONS

The present invention is related to the following commonly-owned, co-pending U.S. patent applications filed on even date herewith, the entire contents and disclosures of each of which are expressly incorporated by reference herein as if fully set forth herein: U.S. patent application Ser. No. 11/862,071, for "MICROWAVE DIRECTION DETECTOR BY PARALLEL SAMPLING" and patent application Ser. No. 11/862,078, for "DIRECTION OF TRAVEL MOTION DETECTOR."

BACKGROUND OF THE INVENTION

Field of Invention

This invention relates generally to dual technology motion sensors employed in the security industry to detect intruders in a protected area and more particularly, to a method of sensing the direction of travel of an intruder in a protected area.

Dual technology motion sensors for intrusion detection, such as Honeywell's DUAL TEC® Series Sensors include a passive Infrared Radiation sensor (PIR sensor) and a microwave sensor (MW sensor), both of which are employed simultaneously to monitor a protected area for intrusions.

To detect motion, PIR sensors compare an infrared source with one temperature, such as a human passing in front of an infrared source with another temperature, such as a wall. However, PIR sensors do not always detect the presence of an intruder due to elevated room temperatures in the protected area or cloaking by an intruder resulting in situations where PIR may not detect an intruder.

In dual technology sensors, to minimize false alarms, the PIR and microwave technologies compliment each other. A MW sensor employs the Doppler principle where a microwave signal is emitted toward a protected area resulting in a Doppler signal when a moving target is detected. To detect motion, a microwave sensor is monitored for a Doppler signal. For example, if an intruder (target) passes within the protected area, the microwave signals are reflected from the intruder (echo). In other words, the echoed microwave signal is modulated due to the Doppler Effect, where the microwave signal is reflected by the moving target because there is a shift in the reflected signals frequency. This shift is directly proportional to the targets velocity relative to the sensor. Moreover, MW sensors may detect an intruder in the protected area, but without verification from the PIR sensor, no alarm is generated. A short coming of the dual technology sensor is when one technology detects an intruder, but the other technology doesn't and no alarm is generated.

SUMMARY OF THE INVENTION

The present invention provides a method of detecting direction of travel of a target in a protected area using microwave direction of travel sensing and generates an alarm when the PIR fails to detect an intruder.

In the present invention a microwave direction of travel detector comprises, a microwave transceiver for transmitting and receiving a microwave signal directed toward a protected area that outputs a Doppler Signal when a moving target is detected, an amplifier chain consisting of one or more amplifiers with at least one of the stages having variable gain that is sampled and controlled by a controller. The controller monitors the output of the amplifier chain and adjusts the gain of a variable gain amplifier to keep the Doppler signal level constant and to keep the amplifiers from saturating. If the microcontroller is decreasing the gain over time, than the target is approaching. If the microcontroller is increasing the gain, than the target is receding. The controller can be a microcontroller, a FPGA or a DSP.

BRIEF DESCRIPTION OF THE DRAWINGS

These and other features, benefits and advantages of the present invention will become apparent by reference to the following text figures, with like reference numbers referring to like structures across the views, wherein:

The FIGURE depicts a dual technology motion sensor for detecting the direction of travel of an intruder by sampling according to the present invention. This invention may be for a stand alone microwave sensor or may be part of a Dual Technology sensor comprising a microwave technology combined with PIR, ultrasonic, video or some other technology.

DETAILED DESCRIPTION OF THE INVENTION

With reference to the FIGURE a novel dual technology motion sensor 100 capable of detecting direction of travel of an intruder by serial sampling an area to be monitored will now be described in accordance with one embodiment of the present invention. FIG. 1 depicts a single microwave transceiver 110, a microcontroller 150, and an alarm 170 for transmitting to a control panel (not shown). In another embodiment of the present invention, as known to those skilled in the art, the microprocessor can be replaced by a FPGA, or a DSP.

As illustrated in the FIGURE, a first amplifier 130 receives a Doppler signal from the microwave transceiver 110 at input terminal 132 and outputs an amplified Doppler signal at output terminal 134. A variable gain amplifier 140 is connected via input terminal 142 to the output terminal 134 of the first amplifier 130. The number of variable gain amplifiers as shown in the FIGURE can be any number and is not limited to one variable gain amplifier as known to those skilled in the art. Microcontroller 150 monitors the output terminal 144 of the second variable gain amplifier at port 156 to determine if a Doppler signal is of sufficient amplitude to indicate a moving target.

Microprocessor 140 includes port 154 for sending a feedback signal 164 to the variable gain amplifier 140. The feedback signal is used to adjust the gain of the amplifier to keep the observed signal within levels of normal operation of the amplifiers. In other words, the higher the feedback signal, the lower the gain of the amplifiers. By monitoring the feedback signals, microcontroller 150 can determine if an intruder is getting closer (feedback signal increasing, gain decreasing) or if the intruder is receding (feedback signal is decreasing, gain increasing).

The present invention, as described above provides a novel dual technology motion sensor capable of detecting direction of travel of an intruder by series sampling an amplified Doppler signal at different gain levels of an area to be monitored. By providing variable gain amplifiers coupled to a microcontroller, the present invention can calculate the direction of travel of an intruder.

As will be readily apparent to those skilled in the art, the present invention or aspects of the invention can be realized in hardware, or as some combination of hardware and software.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. A microwave direction of travel detector comprising:
   a microwave transceiver that transmits and receives a microwave signal directed toward a protected area and that outputs a Doppler signal when a moving target is detected;
   an amplifier chain including one or more amplifiers coupled to the microwave transceiver that receives and amplifies said Doppler signal from said microwave transceiver, wherein at least one amplifier having variable gain; and;
   a controller that samples an output gain of each said variable gain amplifier and that controls each said variable gain amplifier by adjusting a gain of each said variable gain amplifier to keep said Doppler signal level constant and to avoid saturation of each said variable gain amplifier.

2. The microwave direction of travel detector of claim 1, wherein if the output gain of each said variable gain amplifier is decreasing the controller indicates that an intruder is getting closer to the microwave transceiver, while if the said gain of each said variable gain amplifier is increasing the controller indicates that an intruder is receding from the microwave transceiver. In either case an alarm is generated.

3. The microwave direction of travel detector of claim 1, wherein the controller is a microcontroller, a FPGA a ASIC or a DSP chip.

4. A direction of travel detection method using a microwave sensor comprising the steps of:
   transmitting and receiving, by a microwave transceiver a microwave signal directed toward a protected area and outputting a Doppler signal if a moving targets is detected;
   amplifying said Doppler signals, by an amplifier chain including one or more amplifiers coupled to the microwave transceiver, wherein at least one amplifier having variable gain;
   sampling an output gain of each said variable gain amplifier by a controller and controlling each said variable gain amplifier by adjusting said gain of each said variable gain amplifier to keep said Doppler signal level constant and to avoid saturation of each said variable gain amplifier.

5. The direction of travel detection method of claim 4, further including the step of:
   determining, by the controller if the output gain of each said variable gain amplifier is increasing or decreasing; and
   generating an alarm if the controller determines an increasing or decreasing output gain of each said variable gain amplifier.

6. The direction of travel detection method of claim 5, wherein if the controller determines that the output gain of each said variable gain amplifier is increasing and determines that the output of gain of each said variable gain amplifier is decreasing, the controller indicates that an intruder is getting closer to the microwave transceiver, while if the feedback signals is decreasing and the output gain of each said variable gain amplifier is increasing the controller indicates that an intruder is receding from the microwave transceiver.

7. The direction of travel detection method of claim 6, wherein if the output gains of each said variable gain amplifier is neither increasing or decreasing no alarm is triggered.

8. The direction of travel detection method of claim 1, wherein said direction of travel detection method operates in two modes;
   a first mode, wherein an alarm is triggered if both a PIR sensor and a microwave sensor detect motion; and
   a second mode, wherein an alarm is triggered if said microwave sensor detects motion and a direction of travel of said target.

9. The direction of travel detection method of claim 8, wherein the microwave sensor can identify said intruder in different zones.

* * * * *